United States Patent
Russell

(10) Patent No.: US 6,920,485 B2
(45) Date of Patent: *Jul. 19, 2005

(54) PACKET PROCESSING IN SHARED MEMORY MULTI-COMPUTER SYSTEMS

(75) Inventor: Lance W. Russell, Hollister, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 663 days.

This patent is subject to a terminal disclaimer.

(21) Appl. No.: 09/971,989

(22) Filed: Oct. 4, 2001

(65) Prior Publication Data

US 2003/0069939 A1 Apr. 10, 2003

(51) Int. Cl.[7] .............................................. G06F 15/167
(52) U.S. Cl. ..................... 709/214; 709/217; 709/238; 709/242
(58) Field of Search ................................. 709/214, 217, 709/238, 242, 251

(56) References Cited

U.S. PATENT DOCUMENTS

| | | | |
|---|---|---|---|
| 5,475,858 A | * 12/1995 | Gupta et al. | 712/29 |
| 5,940,870 A | * 8/1999 | Chi et al. | 711/206 |
| 5,987,506 A | * 11/1999 | Carter et al. | 709/213 |
| 6,006,259 A | 12/1999 | Adelman et al. | |
| 6,021,132 A | 2/2000 | Muller et al. | |
| 6,026,461 A | 2/2000 | Baxter et al. | |
| 6,078,957 A | 6/2000 | Adelman et al. | |
| 6,078,994 A | 6/2000 | Carey | |
| 6,101,543 A | 8/2000 | Alden et al. | |
| 6,154,796 A | 11/2000 | Kuo et al. | |
| 6,173,375 B1 | * 1/2001 | Arshad | 711/152 |
| 6,192,514 B1 | 2/2001 | Lurndal | |
| 6,247,059 B1 | 6/2001 | Johnson et al. | |
| 6,272,522 B1 | 8/2001 | Lin et al. | |
| 6,424,621 B1 | * 7/2002 | Ramaswamy et al. | 370/230 |
| 6,631,447 B1 | * 10/2003 | Morioka et al. | 711/141 |
| 2003/0037178 A1 | * 2/2003 | Vessey et al. | 709/319 |
| 2003/0069938 A1 | * 4/2003 | Russell | 709/213 |

FOREIGN PATENT DOCUMENTS

| | | |
|---|---|---|
| WO | WO 00/30294 | 5/2000 |
| WO | WO 00/30321 | 5/2000 |
| WO | WO 00/57286 | 9/2000 |
| WO | WO 01/15393 | 3/2001 |
| WO | WO 01/16737 | 3/2001 |
| WO | WO 01/16742 | 3/2001 |
| WO | WO 01/16743 | 3/2001 |
| WO | WO 01/16750 | 3/2001 |
| WO | WO 01/27781 | 4/2001 |

OTHER PUBLICATIONS

US 6,014,703, 1/2000, McCrory et al. (withdrawn)

* cited by examiner

Primary Examiner—Reba I. Elmore

(57) ABSTRACT

Systems and methods of processing packets in a shared memory multi-computer environment are described. A local shared memory network is provided between local nodes and a global shared memory network is provided between the local nodes and one or more remote nodes. In this way, local nodes may communicate through standard network interfaces while using shared memory as the physical transport medium. In addition, a multi-computer system may be addressed externally and internally as individual nodes over the local shared memory network. A multi-computer system also may be addressed externally and internally as a single node over the global shared memory network.

37 Claims, 7 Drawing Sheets

PACKET PROCESSING IN SHARED MEMORY MULTI-COMPUTER SYSTEMS

TECHNICAL FIELD

This invention relates in general to shared memory multi-computer systems and, in particular, to methods for processing packets in shared memory multi-computer systems.

BACKGROUND

Historically, large-scale parallel computer systems were constructed with specialized processors and customized interconnects and, consequently, were characterized by a high cost and a long time-to-market. Currently, multi-computer systems (e.g., clustered computer systems) are being built with standard processors and standard networks. By using standard components and networks, such multi-computer systems are cheaper to design and may be brought to market in a shorter time. Multi-computer systems consist of a parallel or distributed collection of whole computers (referred to herein as "nodes) that cooperate to perform computing tasks. In general, a node may include one or more processors, a memory, input/output facilities, and an operating system. A cluster is a type of multi-computer system that may be used as a single, unified computing resource.

Many different shared memory processing systems have been developed. For example, symmetric multiprocessing (SMP) systems have been developed in which multiple processors on a bus, or a plurality of busses, share a single global memory. SMP machines execute only one copy of the operating system. While tasks can be given to different processors to perform, they cannot be given to different copies of the operating system. In shared memory multiprocessor systems, all memory is uniformly accessible to each processor, simplifying the task of dynamic load distribution. Complex tasks may be distributed among various processors in an SMP system, while the data used for processing is available to each of the processors in the system. In general, programmers writing code for such shared memory SMP systems need not be concerned with data partitioning issues because each of the processors has access to and shares the same, consistent global memory.

Multi-computer architectures based on cache coherent non-uniform memory access (CCNUMA) have been developed as an extension of the shared memory architecture of SMP systems. Shared memory multi-computer systems, unlike SMP systems, execute different copies of the operating system on each of the processors or groups of processors in the system. CCNUMA architectures typically are characterized by a distributed global memory. In general, CCNUMA machines consist of a number of processing nodes that are connected through a high bandwidth, low latency shared memory interconnection network. Each of the processing nodes includes one or more high-performance processors, each having an associated cache, and a portion of a global shared memory. Each node has a near memory and a far memory. Near memory is resident on the same physical circuit board as the node processors and is directly accessible to the node processors over a local memory bus. Far memory is resident on other nodes and is accessible over a main system interconnect. Cache coherence (i.e., the consistency and integrity of shared data stored in multiple caches) typically is maintained by a directory-based, write-invalidate cache coherency protocol. To determine the status of caches, each processing node typically has a directory memory corresponding to its respective portion of the shared physical memory. For each discrete addressable block of memory, the directory memory stores an indication of remote nodes that are caching that same block of memory.

In general, when developing a multi-computer system it is desirable to provide a computing environment that may run a wide variety of existing application programs, including those that were developed for other parallel computing environments (e.g., an SMP computing environment), without requiring significant re-programming. The single address space of shared memory multi-computer systems increases the programmability of multiprocessors by reducing problems, such as data partitioning and dynamic load distribution. The shared address space also provides better support for parallelizing compilers, standard operating systems, multiprogramming, and incremental tuning of parallel machines. One difficulty associated with shared memory multi-computer systems, however, involves synchronizing access to shared resources, particularly when an application program that originally was coded under the assumption that it was the only application program having access to the system resources.

SUMMARY

The invention features systems and methods of processing packets in a shared memory multi-computer environment that provides a local shared memory network between local nodes and a global shared memory network between the local nodes and one or more remote nodes. In this way, local nodes may communicate through standard network interfaces while using shared memory as the physical transport medium. In addition, the invention enables a multi-computer system to be addressable externally and internally as individual nodes over the local shared memory network. This feature enables applications to have particular node affinities (such as hardware affinities), and enables distributed processing within the multi-computer system partition. The invention also enables a multi-computer system to be addressable externally and internally as a single node over the global shared memory network. This feature enables the system to be used as a single, unified computing resource and reduces system administration and client application development overhead. In addition, the invention provides an interface that makes the shared memory facility appear to application programs as a regular network. Thus, application programs may use the shared memory facility without having to be re-coded. Rather application program views the shared memory facility as a normal network device. High-level software programs do not have to worry about multiple operating systems accessing the shared memory at the same time, nor do they have to do anything special to achieve the enhanced performance provided by the shared memory facility. These features may be provided by low-level software creating a network illusion.

In one aspect, the invention features a multi-computer system comprising a plurality of local nodes that are interconnected by a shared memory. Each local node includes a local processor, a local memory, a local communications protocol stack, and a shared memory interface system. The shared memory interface system is operable to provide a local shared memory network between the local nodes, and a global shared memory network between the local nodes and one or more remote nodes by capturing packets from the local communications protocol stacks and routing the captured packets over the shared memory.

Embodiments of the invention may include one or more of the following features.

The shared memory interface system on each local node preferably comprises a local shared memory virtual adapter and a global shared memory virtual adapter. The local shared memory virtual adapters are operable to capture locally addressed packets from the local communications protocol stacks and to route the captured packets for physical transport over the shared memory. The global shared memory virtual adapters are operable to capture globally addressed packets from the local communications protocol stacks and to route the captured packets for physical transport over the shared memory.

The local shared memory virtual adapters preferably appear to the local communications protocol stacks as device drivers for physical network adapters that are connected to the local shared memory network. The global shared memory virtual adapters also preferably appear to the local communications protocol stacks as device drivers for physical network adapters that are connected to the global shared memory network.

The global shared memory network allows all of the local nodes to be addressed by a single network address. In this way, packets may be diverted from one node to another in a manner that is transparent to remote client nodes (e.g., a remote client node does not have to explicitly make a connection to a local node that is actually servicing the remote client node). The local shared memory network enables local nodes to communicate over shared memory using conventional network software. In addition, the local shared memory network enables each local node to be addressed uniquely through a local shared memory network address.

In some embodiments, the global shared memory virtual adapters are responsive to a common global address for the global shared memory network. In these embodiments, the global shared memory virtual adapters are operable to capture from the local communications protocol stacks packets destined to a global network address and transmitted from a local network address. The global shared memory virtual adapters preferably are operable to route in-bound packets to other local nodes over the global shared memory network. The shared memory interface system on each local node preferably is operable to maintain in local memory a data structure identifying active local nodes connected to the global shared memory network.

One or more local nodes may possess one or more physical network adapters for connection to one or more remote nodes. In some embodiments, the shared memory interface system is operable to route packets to local nodes over the global shared memory network in accordance with an open shortest path first (OSPF) routing protocol. In these embodiments, local nodes comprising physical network adapters are configured as OSPF area border routers. Packets are routed over the global shared memory network preferentially to local nodes that are configured as OSPF area border routers. The OSPF cost metrics may be set so that routes to OSPF area border routers are preferentially over the local shared memory network or any other physical network that may be present between the nodes.

The shared memory interface system on each local node preferably supports multicast and broadcast transmissions over the shared memory for the local shared memory network and the global shared memory network. A broadcast ring structure and a multicast ring structure may be allocated in shared memory for each of the local and global shared memory networks. The broadcast ring structure and the multicast ring structure may be reallocated to an active node in response to a failure of a local node originally allocating the broadcast ring structure or the multicast ring structure.

For each of the local and global shared memory networks a pair of transmit/receive ring structures may be allocated in shared memory for each pair of local nodes. Each transmit/receive ring structure may correspond to a pre-allocated number of fixed size scribble buffers in shared memory. The shared memory interface system on each local node may be operable to allocate a transmit/receive ring structure in shared memory for each of the other local nodes. The shared memory interface system on each local node also may be operable to connect to a transmit/receive ring structure that is allocated by a given node in response to receipt of a broadcast packet from the given node. The shared memory interface system on each local node may be operable to allocate a transmit/receive ring structure for the given node in response to receipt of the broadcast packet from the given node. A read pointer and a write pointer may be associated with each transmit/receive ring structure. In some embodiments, a write pointer is modifiable only by a transmitting node and a read pointer is modifiable only by a receiving node.

The shared memory may be implemented by a global shared memory facility, a distributed shared memory facility, or a logically shared memory facility.

In another aspect, the invention features a computer program residing on a computer-readable medium in a multi-computer system. The computer program comprises computer-readable instructions for causing a computer to provide a local shared memory network between the local nodes, and a global shared memory network between the local nodes and one or more remote nodes by capturing packets from the local communications protocol stacks and routing the captured packets over the shared memory.

The invention also features a method of processing packets in a shared memory multi-computer system.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
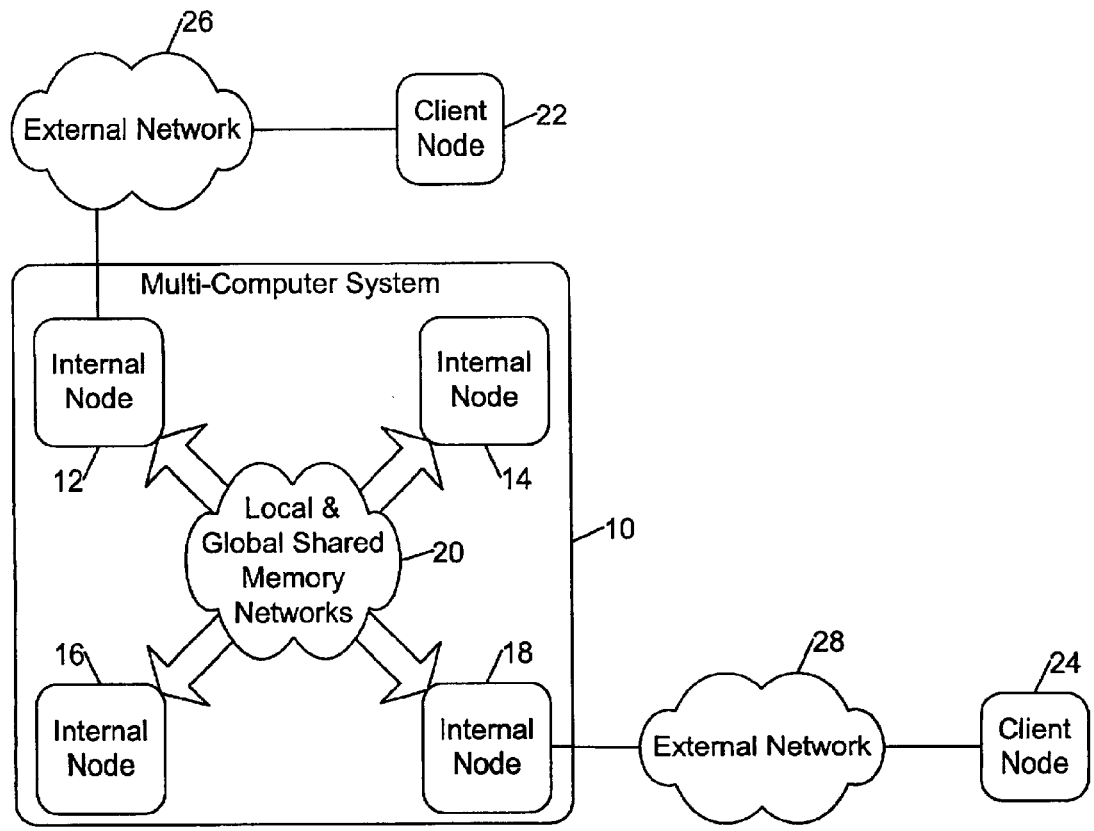
FIG. 1 is a block diagram of a multi-computer system, which includes a local shared memory network and a global shared memory network, and two remote clients that are connected to the multi-computer system by two external networks.

Referring to FIG. 1, in one embodiment, a multi-computer system 10 includes a plurality of internal nodes 12, 14, 16, 18 that are interconnected by a shared memory facility 20 on which a local shared memory network and a global shared memory are constructed. Remote client nodes 22, 24 may connect to multi-computer system 10 over a pair of external networks 26, 28. Remote client nodes 22, 24 each may be implemented as a single computer system or a multi-computer system having nodes that are interconnected to form a network. In multi-computer system embodiments, the component systems of remote client node 22 or remote client node 24, or both, may be implemented in one or more whole computer systems. Client nodes 22, 24 include conventional network interfaces (not shown) that provide electronic and communication interfaces to external networks 26, 28. External networks 26, 28 each may be implemented as a LAN or a WAN. External networks 26, 28 may be connected to remote client nodes 22, 24 by conventional network routers (not shown). External networks 26, 28 may be of the same or different types. For example, external network 26 may be an Ethernet network and external network 28 may be an ATM (Asynchronous Transfer Mode) network. In addition, external networks 26, 28 may have different performance characteristics from one another. For example, external networks 26, 28 may have different load conditions, transmission characteristics, and maximum transmission unit (MTU) sizes (i.e., the largest packet sizes that can be transmitted over the networks).

Communications with multi-computer system 10 are conducted in accordance with a routable communications protocol (e.g., TCP/IP, SNA, OSI, XNS, IPX, AppleTalk, and DECnet). In the illustrated embodiment, network communications with multi-computer system 10 are described in accordance with the TCP/IP protocol. Accordingly, multi-computer system 10, remote client nodes 22, 24, and external networks 26, 28 each are assigned a unique IP address. Any additional network nodes (e.g., routers) that are distributed along the routes between remote client nodes 22, 24 and multi-computer system 10 also are assigned a respective IP address. As explained in detail below, remote client nodes 22, 24 may access internal nodes 12–18 individually or they may access multi-computer system 10 as a single, unified computing resource in accordance with a standard routable network communication protocol. In addition, each of the internal nodes 12–18 may access another internal node 12–18 or one or more of the remote client nodes 22, 24 in accordance with the same standard routable network communication protocol; even internal nodes that are not physically connected to an external network may access one or more of the remote client nodes 22, 24 over the shared memory networks. All communications through multi-computer system 10 may be conducted using shared memory as the physical transport medium. In this way, the congestion and processing overhead caused by the duplication and storage of multiple copies of data packets in non-shared-memory communications networks may be avoided.

General Operating Environment of the Shared Memory Networks

Figure 2:
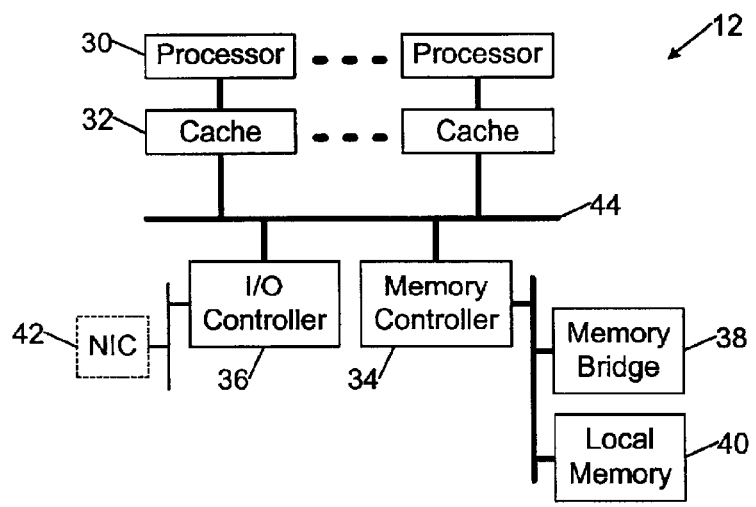
FIG. 2 is a block diagram of components of an internal node of the multi-computer system of FIG. 1.

Referring to FIG. 2, in one embodiment, each of the internal nodes 12–18 is implemented as a single, whole computer system that includes one or more processors 30 with an associated cache 32, a memory controller 34, and an input/output (I/O) controller 36. The memory controller 34 is connected to a memory bridge 38 and a local memory 40. The input/output (I/O) controller 36 may be connected to one or more network interface cards (NICs) 42, which provides a physical connection to an external network 26, 28. The processors 30 communicate with memory controller 34 and I/O controller 36 over a memory (or system) bus 44, which may be compatible with any of a variety of bus protocols, including PCI, VESA, Microchannel, ISA, and EISA. Memory bridge 38 provides a coherent physical layer interconnecting the memory busses of internal nodes 12–18 to form a virtual computer system. Memory controller 34 controls the flow of data between processors 30 and the local memory 40 and remote memory (i.e., memory residing on another internal node). In this architecture, if a processor 30 requests data that is not in cache 32 or in local memory 40, memory controller 34 retrieves the data from a remote memory through memory bridge 38. Memory controller 34 may include bus-snooping protocols and other intelligence to maintain cache coherence. For example, memory controller 34 may communicate with the memory controllers of other internal nodes in accordance with a standard cache coherence protocol (e.g., the ANSI/IEEE Scalable Coherent Interface protocol (SCI)) that provides shared memory across internal nodes 12–18. In one such embodiment, multi-computer system 10 may be implemented as an AViiON server multi-computer system, which is available from EMC Corporation of Hopkinton, Mass., U.S.A.

Figure 3:
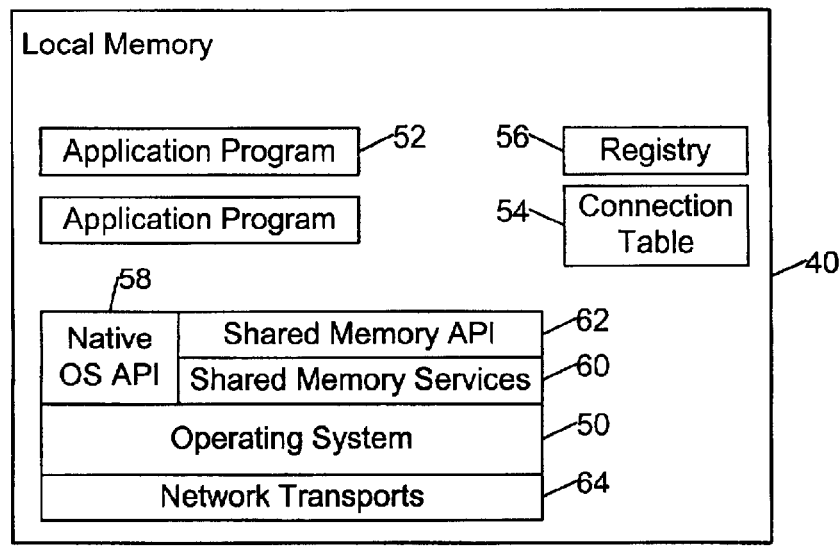
FIG. 3 is a diagrammatic view of an execution environment provided by the internal node of FIG. 2.

As shown in FIG. 3, a number of program modules may be stored in the local memory 40 of each internal node 12–18, including an operating system 50 (e.g., the Windows NT® operating system available from Microsoft Corporation of Redmond, Wash. U.S.A.), one or more application programs 52, and program data, such as a connection table 54 and a registry (or configuration database) 56. In this way, each internal node 12–18 may execute its own copy of the operating system. Operating system 50 includes an executive that provides the base operating system services (e.g., memory management, process and thread management, security, input/output, and interprocess communication) for creating a run-time execution environment on an internal node 12–18. The registry 56 contains the following information: parameters needed to boot and configure the system; system-wide software settings that control the operation of operating system 50; a security database; and per-user profile settings. A native operating system (OS) application programming interface (API) 58 exposes the base operating system services of the executive to user applications 52 and to one or more shared memory services (or services modules) 60. As used herein, the term "service" (or "service module") refers to a component of an operating system that provides a set of one or more functions. The shared memory service modules 60 are device drivers that may be configured to start automatically at system boot time without requiring an interactive logon; they also may be controlled dynamically during run-time. The shared memory service modules 60 call certain base operating system services (or functions) to interact with a service controller; such functions may include registering a successful startup, responding to status requests, and pausing or shutting down the service. The service controller starts, manages and directs operations within the service modules 60. The shared memory service modules, on the other hand, create the environment in which one or more processes may operate and control the start-up, maintenance and termination of such processes. The shared memory service modules are designed to configure the shared memory facility to look like a conventional transport medium and make it available to networking applications. In this way, networking applications do not have to be re-coded before using a shared memory connection.

Typically, the run-time execution environment is installed on an internal node 12–18, and application programs 52 may access the functionality provided by the shared memory service modules 60 through a shared memory API 62. The shared memory modules, however, allow the application programs 52 to access the functionality provided by the shared memory service modules 60 without being recorded to a shared memory API. Instead, application programs simply may use existing networking APIs. Before a shared memory service module 60 may operate in the run-time execution environment, it must be installed on an internal node 12–18. A shared memory service module 60 typically is installed by storing the shared memory service module 60 in a data storage area that is accessible by an internal node 12–18 (e.g., on a disk of a permanent storage system), and registering the attributes of the service module 60 in the registry 56. Further details about the Windows NT® operating system may be obtained from "Inside Windows NT," Second Edition, David A. Solomon, Microsoft Press (1998), which is incorporated herein by reference.

The execution environment stored in local memory 40 also includes a set of network transport protocols 64. In the illustrated embodiment, communications over the local and global shared memory networks are conducted in accordance with the Transmission Control Protocol/Internet Protocol (TCP/IP). The TCP portion of the protocol provides the transport function by breaking a message into smaller packets, reassembling the packets at the other end of the communication network, and re-sending any packets that get lost along the way. The IP portion of the protocol provides the routing function by assigning to the data packets addresses for the destination network and the target node at the destination network. Each data packet that is communicated using the TCP/IP protocol includes a header portion that contains the TCP and IP information. The IP protocol provides no guarantee of packet delivery to the upper layers of the communications stack. The TCP protocol, on the other hand, provides a connection-oriented, end-to-end transport service with guaranteed, in-sequence packet delivery. In this way, the TCP protocol provides a reliable, transport layer connection. In other embodiments, communications over the local and global shared memory networks may be conducted in accordance with the User Datagram Protocol/Internet Protocol (UDP/IP). UDP may be used in place of TCP in conditions when a reliable delivery is not required. For example, UDP/IP is often used for real-time audio and video traffic where lost data packets are simply ignored, because there is no time to retransmit. Gateways may be used to convert into a TCP/IP (or UDP/IP) format data packets that are received from external networks using different protocols. The execution environment also includes hardware link level and access protocols, which may correspond to the Data link and Physical layers of the Open System Interconnection (OSI) reference model.

At system start up, each internal node 12–18 must determine an IP address for each of its network interfaces before it may communicate using TCP/IP. For example, an internal node 12–18 may need to contact a server to dynamically obtain an IP address for one or more of its network interfaces. The internal node 12–18 may use a Dynamic Host Configuration Protocol (DHCP) to issue a request for an IP address to a DHCP server. For example, a DHCP module broadcasts a DHCP request packet at system start up requesting allocation of an IP address for an indicated network interface. Upon receiving the DHCP request packet, the DHCP server allocates an IP address to the requesting internal node 12–18 for use with the indicated network interface. The requesting internal node 12–18 then stores the IP address in the response from the server as the IP address to associate with that network interface when communicating using TCP/IP.

General Architecture of the Shared Memory Networks

As mentioned above, two shared memory networks are created: (1) a local shared memory network supporting traditional node specific addresses; and (2) a global shared memory network supporting global node addresses. In this way, internal nodes 12–18 may communicate through standard network interfaces while using shared memory as the physical transport medium. Over the local shared memory network, multi-computer system 10 may be addressed externally and internally as individual nodes. Thus, the local shared memory network provides a mechanism for sending a message to a specific internal node. This feature enables applications to have particular node affinities (such as hardware affinities), and enables distributed processing within the multi-computer system partition. Over the global shared memory network, multi-computer system 10 may be addressed externally and internally as a single node. Thus, a message addressed to the global network may be routed to any internal node. This feature enables the system to be used as a single, unified computing resource and reduces system administration and client application development overhead.

In general, the local shared memory network and the global shared memory network have the following characteristics:

Packet delivery is unreliable. The software that is designed for these networks can an will drop packets. The applications and communications protocols (e.g., TCP) are relied upon to insure reliability.

Each packet is treated as an autonomous unit of data. The local shared memory network maintains no knowledge of connections or associations. The global shared memory network maintains knowledge of connections and associations, but only maintains minimal state information.

Data delivery between internal nodes 12–18 is guaranteed to be in order.

Figure 4:
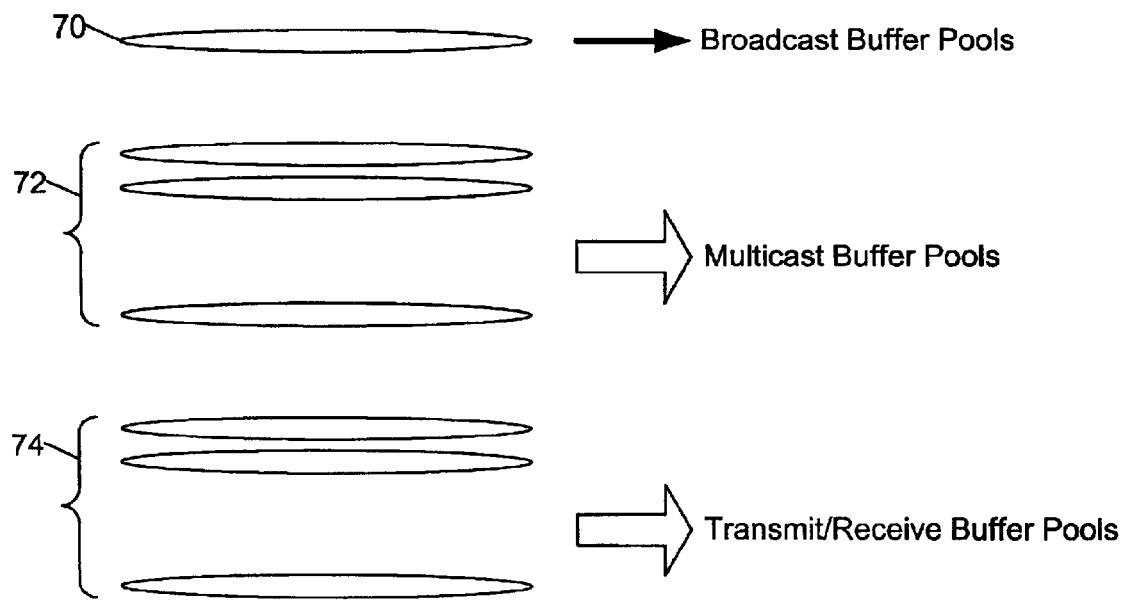
FIG. 4 is a diagrammatic view of a plurality of ring structures that are allocated in shared memory to implement the local and global shared memory networks of FIG. 1.

Referring to FIG. 4, in one embodiment, for each of the local and global shared memory networks a number of shared memory rings are created. In particular, for each shared memory network, the following structures are allocated in global shared memory: (1) one broadcast ring 70 per system partition; (2) a configurable number of multicast rings 72; and (3) a pair of transmit/receive rings 74 between each pair of internal nodes 12–18 (i.e., for a four-node multi-computer system, twelve transmit/receive rings are created). In some embodiments, each of the shared memory rings corresponds to a respective pool of a fixed number of scribble buffers (or slots) in global shared memory. In other embodiments, the buffer pools may have variable lengths, and a linked list reconstruction algorithm may be used to reconstruct the pools in the event of failure. Each pool slot is a data buffer having a size of approximately one MTU. In the illustrated embodiment, the MTU may range in size from 1,490 bytes to 65,536 bytes. The MTU size is a configurable parameter for each of the local and global shared memory networks. By making the MTU flexible and configurable network administrators may match the MTU to the physical media connecting the system to the outside world. In some embodiments, multiple shared memory networks may be created with different MTUs. In this way, traffic may be partitioned to take the most efficient path. For example, traffic between the devices utilizing shared memory may travel a link with the largest possible MTU (e.g., 65,536 bytes). Traffic destined to an outside Ethernet, on the other hand, may be directed onto a shared memory network link with a 1,500 byte MTU. Packets on this link may be shaped to this MTU without having to be fragmented when they reach the node that must put the packets on the physical Ethernet.

Figure 5A:
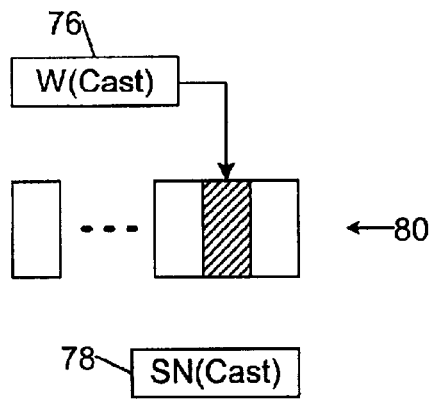
FIG. 5A is a diagrammatic view of a buffer pool, an associated pointer, and a sequence number that are allocated for each of the multicast and broadcast rings supported by the multi-computer system of FIG. 1.

As shown in FIG. 5A, in one embodiment, a write pointer (W(Cast)) 76, which indicates the next slot to which to write, and a slot sequence number (SN(Cast)) 78 are associated with broadcast/multicast buffer pool 80. Each multicast pool also has an associated memory area that labels the multicast address of the pool. In operation, broadcast ring 70 receives all broadcast packets from all of the internal nodes 12–18, and each multicast ring 72 receives all multicast packets that are addressed to its respective multicast address. Each of the broadcast ring 70 and the multicast rings 72 has a configurable fixed depth, which translates into a fixed number of packet slots. Each of the broadcast ring 70 and the multicast rings 72 is allocated at a respective known global address by the first internal node that tries to place a packet in the broadcast ring or the multicast ring. Each of the broadcast ring 70 and the multicast rings 72 is synchronized in accordance with a ticker tape mutual exclusion locking algorithm in which writes are serialized by locks in global shared memory, reads are not serialized, and writers are not blocked for readers but are forced into the "stale" slot.

Figure 5B:
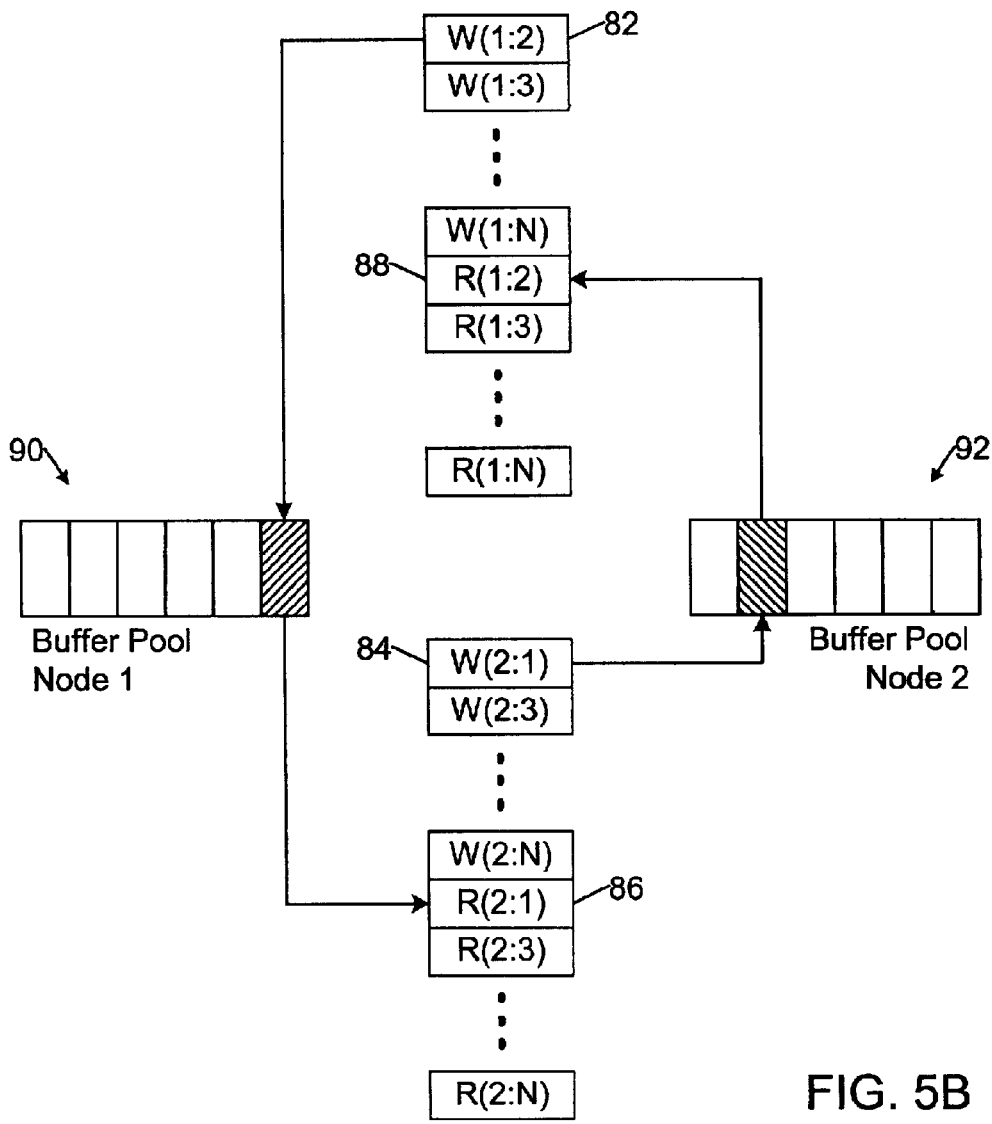
FIG. 5B is a diagrammatic view of a pair of transmit/receive buffer pools and associated read and write pointers that are allocated for communications between a pair of internal nodes of the multi-computer system of FIG. 1.

As shown in FIG. 5B, in one embodiment, a write pointer (W(transmitting node a: receiving node b)) 82, 84 and a read pointer (R(transmitting node a: receiving node b)) 86, 88 are associated with each of the transmit/receive buffer pools 90, 92 that are allocated between each pair of internal nodes 12–18. Each of the transmit/receive rings 74 is configured for unidirectional transfer of data between a pair of internal nodes 12–18. The write and read pointers 82–88 are located in global shared memory. In some embodiments, the write pointers 82, 84 are completely under the control of the transmitting nodes, and the read pointers are completely under the control of the receiving nodes. In these embodiments, local memory locks protect the read and write pointers 82–88. In other embodiments, a global lock may be used to serialize access to the transmit/receive buffer pools 90, 92. In operation, when a writer transmits a packet, a pool slot is filled, the write pointer 82, 84 is incremented, and the receiving node is notified by the generation of an interrupt at the receiving node. At the receiving node, a pool slot is emptied and the read pointer 86, 88 is incremented. There is no "join" processing on the local shared memory network or the global shared memory network. Instead, nodes are discovered when they place a packet in the broadcast pool. When this occurs, each active node connects the pre-allocated receive ring on the discovered node from transmit. These rings are guaranteed to be allocated before processing is initiated on a node. When a node on the local shared memory network fails, the transmit rings into the failed node are marked down and, in the general case, all access to the failed node's shared memory ceases. If the failed node allocated the broadcast pool or any multicast pools, these pools are reallocated on another internal node.

Figure 6:
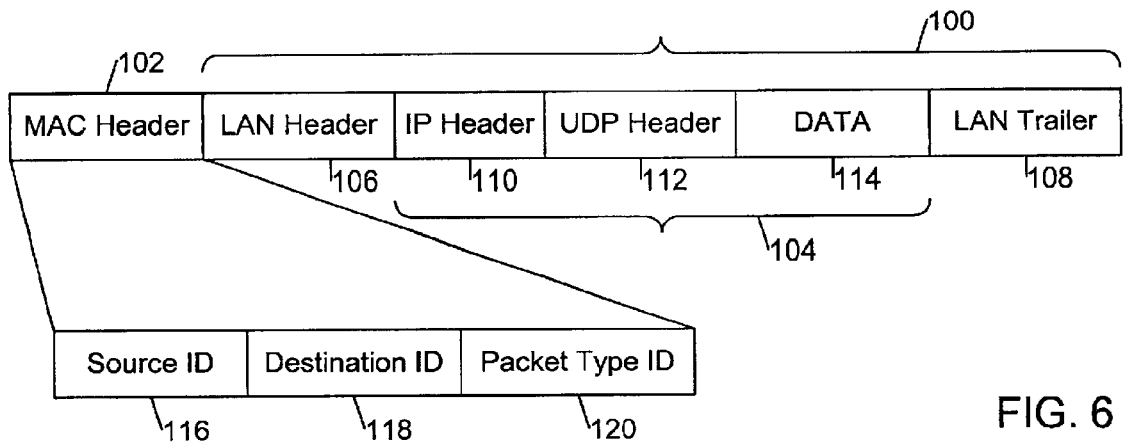
FIG. 6 is a diagrammatic view of a communication packet that includes a media access control (MAC) header for implementing the local and global shared memory networks of FIG. 1.

Referring to FIG. 6, in one embodiment, each packet message that is placed on the local shared memory network or the global shared memory network is encapsulated as a LAN packet 100 that is prefixed by a shared memory MAC header 102. In another embodiment, each message packet may not be encapsulated in a LAN packet with IP and TCP/UDP headers. Instead, these message packets may be presented directly to other local nodes, and protocol (e.g., IP/TCP/UDP) processing is performed only once on the receiving node. The LAN packet 100 includes an Internet packet 104 that is sandwiched between a LAN header 106 and a LAN trailer 108. IP packet 104 includes an IP header 110, a UDP header 112, and a data area 114. As shown in FIG. 6, the shared memory MAC header 102 includes a source identifier 116, a destination identifier 118, and a packet type identifier 120. Source identifier 116 has a size of six bytes, and for non-cast packets, the last two bytes correspond to the source node ID, which may be used by the virtual network adapters (described below) for routing packets to the appropriate shared memory buffer pools. Destination identifier 118 has a size of six bytes, and for non-cast packets, the last two bytes correspond to the destination node ID, which may be used by the virtual network adapters (described below) for routing packets to the appropriate shared memory buffer pools. Packet type identifier 120 has a size of two bytes and corresponds to the packet type identifiers used for IEEE standard 802.3 CSMA/CD local area networks. The packet type identifier 120 may be used for multi-protocol packet multiplexing.

As mentioned above, in one embodiment, the local shared memory network and the global shared memory network are implemented in software by shared memory virtual adapters that are configured to appear to user application programs as standard hardware network interfaces. Data transmissions over the local and global shared memory networks are passed through the shared memory virtual adapters, which control the routing of packets through the shared memory facility 20. Each network adapter registers with the network layer in the TCP/IP (or UDP/IP) stack that it is able to reach IP addresses of interfaces within the local shared memory network or the global shared memory network. In this way, packets received by the TCP/IP (or UDP/IP) stack that are addressed for delivery over the local shared memory network or the global shared memory network will be passed by the TCP/IP (or UDP/IP) stack to the appropriate shared memory virtual adapters. The shared memory virtual adapters, in turn, encapsulate the data packets in suitably addressed data frames and pass the data frames back to the TCP/IP (or UDP/IP) stack to be sent to the correct physical address through the shared memory facility 20 or through a physical network adapter 42.

Figure 7A:
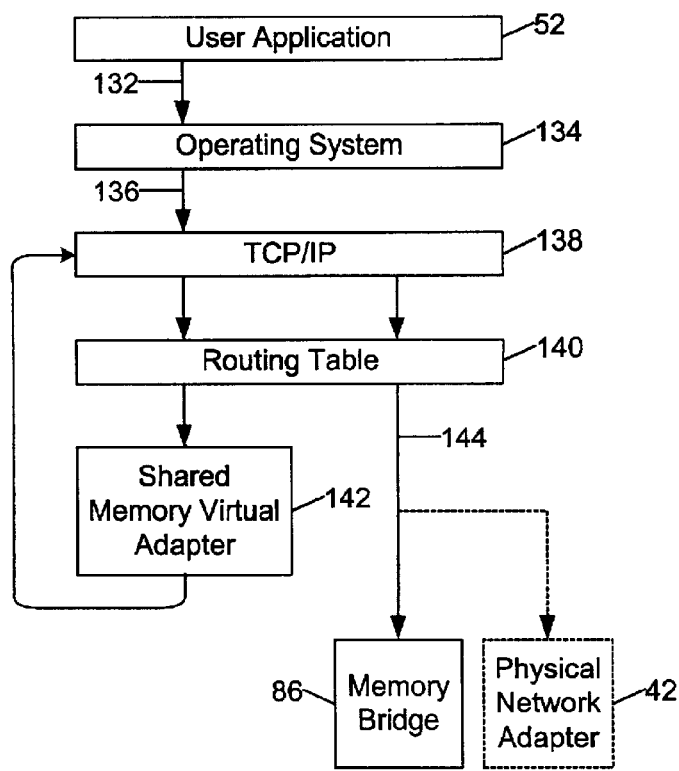
FIG. 7A is a diagrammatic view of packet flow from an application program to a network connection through multiple communication layers, including a shared memory virtual adapter.

Referring to FIG. 7A, a user application 52 may transmit data 132 to be sent over the local shared memory network or the global shared memory network, as follows. Initially, user application 52 transmits data 132 through the operating system API 134. The operating system API 134 converts the received data 132 into data packets 136 in accordance with the TCP/IP (or UDP/IP) protocol by adding the LAN header 106 and the LAN trailer 108, the IP header 110, and the UDP header 112. The operating system API 134 transmits the data packets 136 to the TCP (or UDP) layer of the TCP/IP (or UDP/IP) protocol stack 138. The TCP (or UDP) layer passes the data packets 136 to the IP layer, which refers to a routing table 140 to determine which network interface should be used to reach the destination IP address. The IP layer determines from the routing table 140 that the destination IP address corresponds to a local shared memory network node or a global shared memory network node and, therefore, passes the data packets to an appropriate shared memory virtual adapter 142. The shared memory virtual adapter 142 encapsulates the received data packets into appropriately addressed data frames, each prefixed with a shared memory MAC header 102, and passes the data frames back to the TCP/IP (or UDP/IP) protocol stack 138. The TCP layer forms a TCP layer packet 144 for each data frame, with the data frame as its data. The IP layer consults the routing table 140 and, based upon the routing table entries, routes the TCP layer packets 144 to global shared memory through memory bridge 38 or to an external network 26, 28 through physical network adapter 42.

Figure 7B:
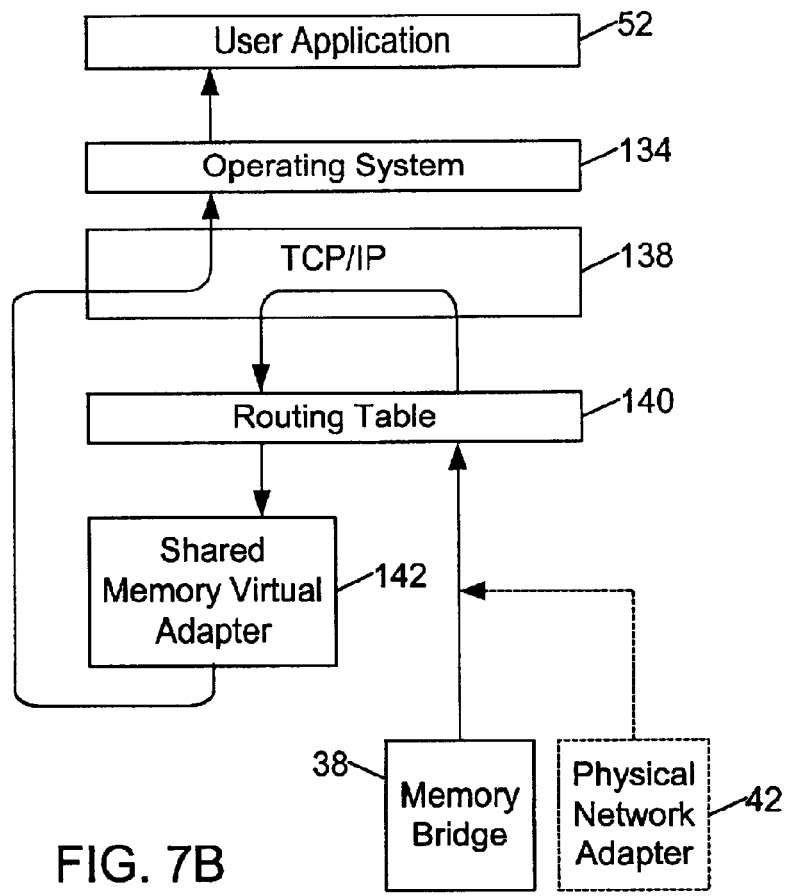
FIG. 7B is a diagrammatic view of packet flow from a network connection to an application program through multiple communication layers, including a shared memory virtual adapter.

Referring to FIG. 7B, data packets addressed for the local shared memory network or the global shared memory network and received through memory bridge 38 or physical network adapter 42 may be transmitted to user application 130, as follows. Initially, data arrives over a physical network and is received by either memory bridge 38 or physical network adapter 42 and passed to a physical network driver. The physical network driver passes the data through the IP layer of the TCP/IP (or UDP/IP) protocol stack 138, which in turn passes the data to shared memory virtual adapter 142 based upon an entry in routing table 140. Shared memory virtual adapter 142 strips off the MAC header 102 and passes the data back to the IP layer of the TCP/IP (or UDP/IP) protocol stack 138. The data is then passed through the TCP/IP (or UDP/IP) protocol stack 138 and the operating system API 134 to the user application 130.

Figure 8:
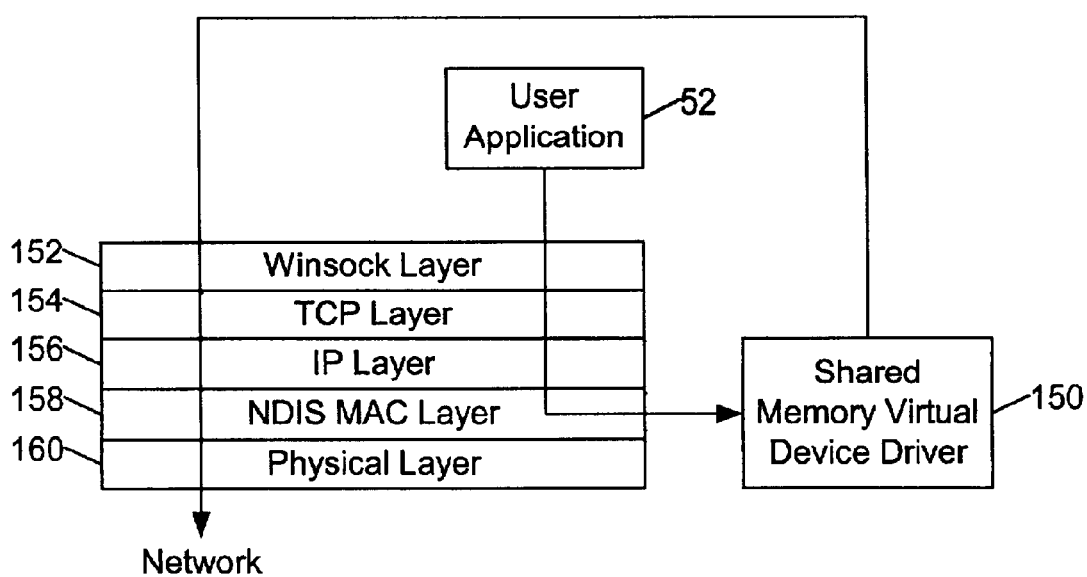
FIG. 8 is a diagrammatic view of packet flow through communication layers in a Microsoft Windows NT® execution environment.

Referring to FIG. 8, in one embodiment, the shared memory virtual adapters are implemented as Network Device Interface Specification (NDIS) MAC intermediate drivers 150 for use in the Microsoft Windows NT® operating environment. In this embodiment, the shared memory virtual adapters appear to the TCP/IP (or UDP/IP) protocol stack as an Ethernet physical adapter. In this embodiment, user application 52 passes data to a WinSock layer 152 that interfaces with the TCP (or UDP) layer 154 of the TCP/IP (or UDP/IP) protocol stack. The user application 52 also passes a destination IP address that is associated with a node on the local shared memory network or the global shared memory network and is accessible through a shared memory virtual adapter 142. The TCP (or UDP) layer 154 passes the data to the IP layer 156, which in turn passes the data to an NDIS MAC interface layer 158. The shared memory virtual device driver 150 previously has registered with the IP layer 156 that it is able to reach a node associated with the destination IP address for the user application data. Accordingly, the IP layer uses the NDIS MAC layer interface 158 to invoke the driver interface to the shared memory virtual device driver 150. The shared memory virtual device driver 150 encapsulates the received data into a data frame prefixed with a shared memory MAC header 102 indicating the IP address of a node on the local shared memory network or the global shared memory network. The shared memory virtual device driver 150 passes the data frame to WinSock layer 152, which passes the data frame through TCP layer 154, IP layer 156, and NDIS MAC interface layer 158 to a physical layer 160. The physical layer 160 transmits data frames to memory bridge 38 or physical network adapter 42.

In the embodiment of FIG. 8, all normal Windows NT® server networking tools, such as the network monitor and the NCP, recognize the shared memory networks and function normally because all driver functions are supported and a MAC header is created. In addition, because a MAC header is constructed, Netbios and Netware should function normally over the local shared memory network. All normal Windows NT® server networking commands, such as ipconfig, route, and netstat, recognize the shared memory networks and function normally. User applications deal with the local and global shared memory networks in the same way that they would deal with other IP interfaces and addresses. Multiple shared memory virtual adapters may be installed on each of the internal nodes 12–18. Each of the virtual adapters may be configured with its own unique IP address. The local shared memory network and the global shared memory network may be multihomed with unique MTUs.

In other embodiments, the shared memory virtual adapters may be implemented in a UNIX-based execution environment. For example, the shared memory virtual adapters may be provided by a STREAMS mechanism, which is a feature of a UNIX-based system that provides a standard way of dynamically building and passing messages up and down a communications protocol stack.

Packet Routing Over the Local Shared Memory Network

In the above-described embodiments, each internal node may be addressed over the local shared memory network by a unique IP address. The local shared memory virtual adapters use shared memory MAC header 102, which includes the node identifier that is embedded in the physical address, to avoid demultiplexing output packets. In particular, the shared memory MAC header 102 includes a special bit that is set to signal internal shared memory virtual device driver commands.

Normal Address Resolution Protocol (ARP) processing may be used to route packets over the local shared memory network. In particular, an ARP process may be used to map IP layer addresses (referred to herein as "IP addresses") to addresses that are used by the hardware link level and access protocols (referred to herein as "physical addresses" or "MAC addresses"). The ARP protocol layer in each internal node 12–18 typically contains a table of mappings between IP addresses and physical addresses (referred to as the "ARP cache"). When a mapping between an IP address and the corresponding physical address is not known, the ARP protocol issues a broadcast packet (an "ARP request" packet) on the local shared memory network. The ARP request indicates an IP address for which a physical address is being requested. The ARP protocols in each internal node 12–18 examine the ARP request, and if an internal node recognizes the IP address indicated by the ARP request, it issues a response (an "ARP response" or "ARP reply" packet) to the requesting internal node indicating the responder's physical address. The requesting ARP protocol reports the received physical address to the local IP layer, which then uses the received physical address to send datagrams directly to the responding internal node.

Packet Routing Over the Global Shared Memory Network

In one embodiment, the global shared memory virtual adapters on each of the internal nodes 12–18 are configured for an identical global IP address, which is read from the registry 56. In this way, network applications executing outside of multi-computer system 10 may address a set of the internal nodes 12–18 using a single global IP address. Multiple global IP addresses may be assigned to one or more sets of the internal nodes 12–18. Global IP addresses are visible to applications running on internal nodes 12–18 and appear as normal network interfaces. Global IP addresses are not linked to any physical adapters. In TCP-based embodiments, the TCP registry entries for the global shared memory virtual adapters are modified to include an additional attribute of GLOBAL. In addition, the TCP/IP layer is modified so that any packet destined to a GLOBAL interface and not received from a GLOBAL interface is handed to a global shared memory virtual adapter for processing. Packets destined to a GLOBAL interface and received from a GLOBAL interface are passed up to the local TCP/IP protocol stack for processing. In UNIX-based embodiments, the ifconfig command may be used to set to GLOBAL flag on the interface.

Figure 9A:
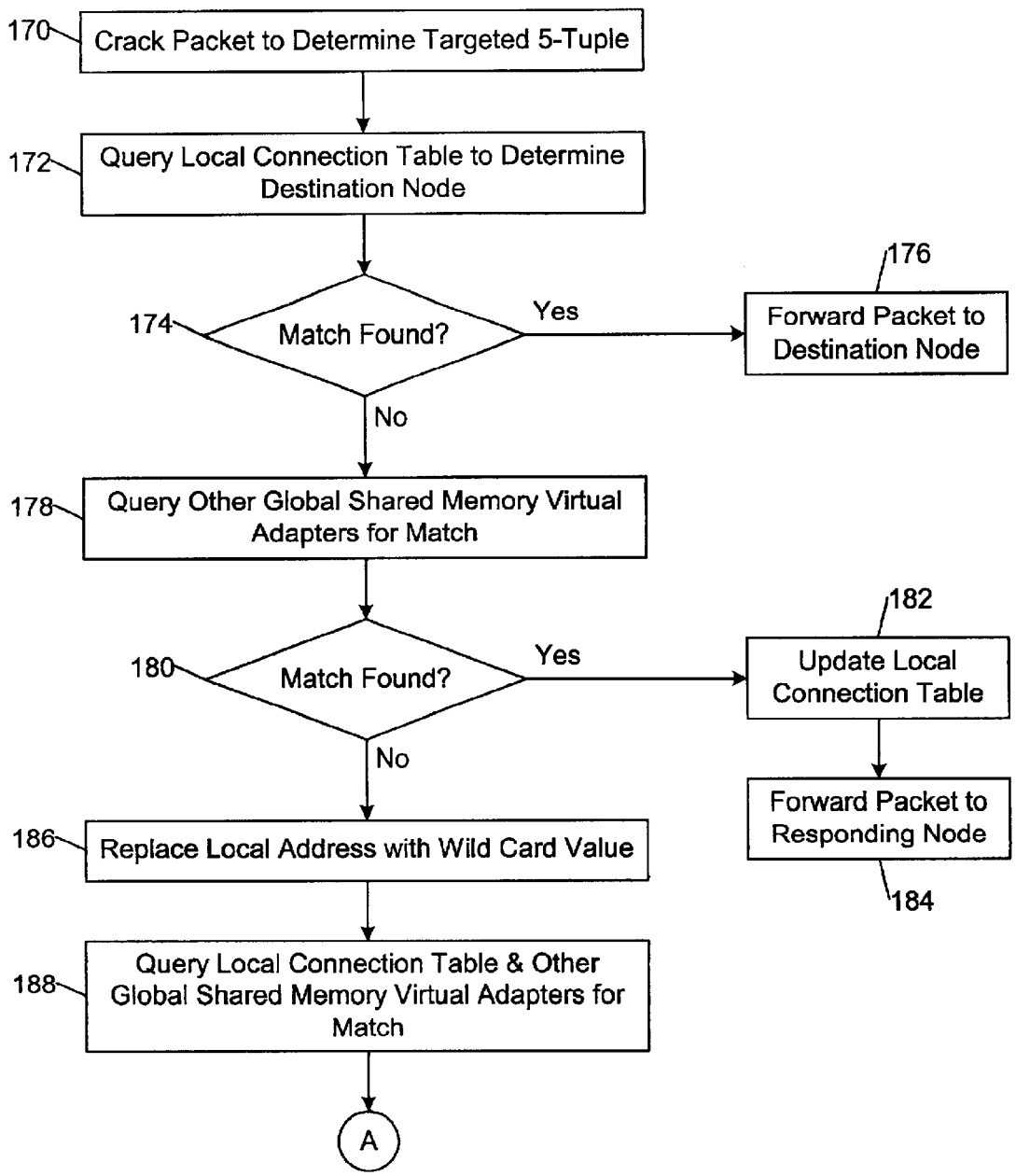
FIGS. 9A and 9B are flow diagrams of a method of routing packets over the global shared memory network of FIG. 1.
Figure 9B:
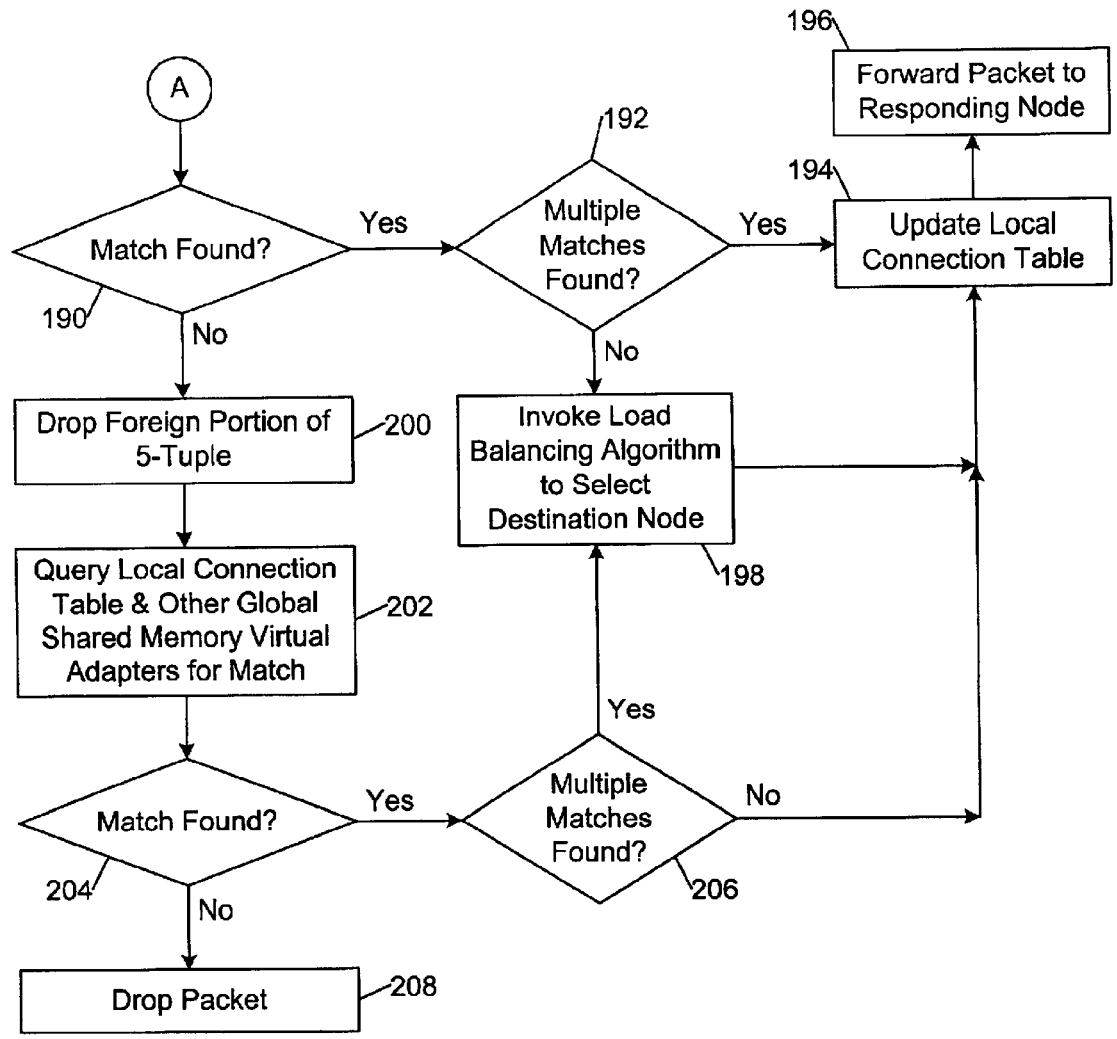

Referring to FIGS. 9A and 9B, the global shared memory virtual adapters may route packets over the global shared memory network, as follows. Initially, a globally addressed packet is cracked to determine its targeted 5-tuple (i.e., <protocol, local address, local port, foreign address, foreign port>), which fully specifies its TCP connections and UDP associations (step 170). Next, the transmitting global shared memory virtual adapter queries a local connection table to identify an exact match for the 5-tuple (step 172). The connection table contains a list of active (or pending) connections to the global shared memory network. In Windows NT®-based embodiments, the Windows NT® TCP/IP protocol stack may be queued to export the location of the open TCP and UDP ports. At initialization and periodically thereafter, the global shared memory virtual adapters walk the port connections to create and update the connection table entries. Garbage collection for the connection tables is triggered by a periodic timer. If an exact match for the 5-tuple is found (step 174), the globally addressed packet is forwarded to the matching node identified in the local connection table (step 176). Otherwise, the transmitting global shared memory virtual adapter queries the global shared memory virtual adapters on other nodes for an exact match (step 178). If another driver responds (step 180), the transmitting global shared memory virtual adapter updates the local connection table with the identifier <node, 5-tuple> (step 182) and forwards the globally addressed packet to the responding node (step 184).

If no exact match is found for the 5-tuple (step 180), the transmitting global shared memory virtual adapter replaces the local address of the 5-tuple with a wild card value (step 186) and queries the local connection table or the other global shared memory virtual adapters for a match (step 188). If a match is found (step 190) this would indicate a server waiting for a connection request on any connected network from a particular foreign address and port. If only one match is found (step 192), the transmitting global shared memory virtual adapter updates the local connection table (step 194) and forwards the globally address packet to the matching node (step 196). If multiple matches are found (step 192), this would indicate that the server has multiple instances executing within the system partition. In this case, the transmitting global shared memory virtual adapter invokes a load-balancing algorithm (e.g., a round robin load-balancing algorithm) to select a destination node (step 198). The transmitting global shared memory virtual adapter updates the local connection table to reflect this selection (step 194) and forwards the globally addressed packet to the selected node (step 196).

If no match is found at this point (step 190), the transmitting global shared memory virtual adapter drops the foreign portion of the 5-tuple entirely (step 200) and queries the local connection table or the other the global shared memory virtual adapters for a match (step 202). If a match is found (step 204), this would indicate a server waiting for a connection request on any connected network from any foreign address or port. If only one match is found (step 206), the transmitting global shared memory virtual adapter updates the local connection table (step 194) and forwards the globally address packet to the matching node (step 196). If multiple matches are found (step 206), this would indicate that the server has multiple instances executing within the system partition. In this case, the transmitting global shared memory virtual adapter invokes a load-balancing algorithm (e.g., a round robin load-balancing algorithm) to select a destination node (step 198). The transmitting global shared memory virtual adapter updates the local connection table to reflect this selection (step 194) and forwards the globally addressed packet to the selected node (step 196).

If no match is found for the globally addressed packet, the packet is dropped (step 208).

In one embodiment, the multi-computer system is configured as an OSPF (Open Shortest Path First) area. In this embodiment, internal nodes that have physical network adapters (referred to herein as "physically connected nodes") are configured as OSPF area border routers. OSPF cross area routing algorithms route first to the optimal area border router into or out of the targeted area. In particular, packets destined to remote nodes (referred to herein as "outbound packets") are routed first to internal nodes that have physical network adapters. In one implementation, OSPF cost metrics are set so that the optimal route to the area border router is always over the local shared memory network. OSPF supports duplicate routes to the same area through alternate area border routers. To improve the availability of the global shared memory network, different nodes are installed with physical adapters and defined as area border routers into the system partition of the multi-computer system 10. In addition, alternate routes from remote global clients are established to each area border router. OSPF detects whenever a node fails, a physical network adapter fails, or a physical network interface changes state, and recovers by invoking an alternate route. OSPF also handles updating of the routing tables.

Although systems and methods have been described herein in connection with a particular multi-computer system environment, these systems and methods are not limited to any particular hardware or software configuration, but rather they may be implemented in any shared memory multi-computer computing or processing environment, including a global shared memory environment, a distributed shared memory environment, or a logically shared memory environment. In general, the component systems of the shared memory virtual adapters may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

Other embodiments are within the scope of the claims.

What is claimed is:

1. A multi-computer system, comprising:
a plurality of local nodes interconnected by a shared memory, each local node comprising
a local processor,
a local memory,
a local communications protocol stack, and
a shared memory interface system operable to provide a local shared memory network between the local nodes and a global shared memory network between the local nodes and one or more remote nodes by capturing packets from the local communications protocol stacks and routing the captured packets over the shared memory;
wherein the shared memory interface system on each local node comprises a local shared memory virtual adapter and a global shared memory virtual adapter;
the local shared memory virtual adapters being operable to capture locally addressed packets from the local communications protocol stacks and to route the captured packets for physical transport over the shared memory; and
the global shared memory virtual adapters being operable to capture globally addressed packets from the local communications protocol stacks and to route the captured packets for physical transport over the shared memory.

2. The multi-computer system of claim 1, wherein the local shared memory virtual adapters appear to the local communications protocol stacks as device drivers for physical network adapters connected to the local shared memory network, and the global shared memory virtual adapters appear to the local communications protocol stacks as device drivers for physical network adapters connected to the global shared memory network.

3. The multi-computer system of claim 1, wherein one or more local nodes comprise one or more physical network adapters for connection to one or more remote nodes.

4. The multi-computer system of claim 1, wherein the shared memory is implemented by a global shared memory facility, a distributed shared memory facility, or a logically shared memory facility.

5. The multi-computer system of claim 1, wherein the global shared memory virtual adapters are responsive to a common global address for the global shared memory network.

6. The multi-computer system of claim 5, wherein the global shared memory virtual adapters are operable to capture from the local communications protocol stacks packets destined to a global network address and transmitted from a local network address.

7. The multi-computer system of claim 6, wherein the global shared memory virtual adapters are operable to route in-bound packets to other local nodes over the global shared memory network.

8. The multi-computer system of claim 7, wherein the shared memory interface system on each local node is operable to maintain in local memory a data structure identifying active local nodes connected to the global shared memory network.

9. The multi-computer system of claim 1, wherein the shared memory interface system on each local node supports multicast and broadcast transmissions over the shared memory for the local shared memory network and the global shared memory network.

10. The multi-computer system of claim 9, wherein a broadcast ring structure and a multicast ring structure are allocated in shared memory for each of the local and global shared memory networks.

11. The multi-computer system of claim 1, wherein for each of the local and global shared memory networks a pair of transmit/receive ring structures are allocated in shared memory for each pair of local nodes.

12. The multi-computer system of claim 11, wherein the shared memory interface system on each local node is operable to allocate a transmit/receive ring structure in shared memory for each of the other local nodes.

13. The multi-computer system of claim 11, wherein a read pointer and a write pointer are associated with each transmit/receive ring structure.

14. The multi-computer system of claim 12, wherein the shared memory interface system on each local node is operable to connect to a transmit/receive ring structure allocated by a given node in response to receipt of a broadcast packet from the given node.

15. The multi-computer system of claim 14, wherein the shared memory interface system on each local node is operable to allocate a transmit/receive ring structure for the given node in response to receipt of the broadcast packet from the given node.

16. A multi-computer system, comprising:
a plurality of local nodes interconnected by a shared memory, each local node comprising
a local processor,
a local memory,
a local communications protocol stack, and
a shared memory interface system operable to provide a local shared memory network between the local nodes and a global shared memory network between the local nodes and one or more remote nodes by capturing packets from the local communications protocol stacks and routing the captured packets over the shared memory;
wherein one or more local nodes comprise one or more physical network adapters for connection to one or more remote nodes, and the shared memory interface system is operable to route packets to local nodes over the global shared memory network in accordance with an open shortest path first (OSPF) routing protocol.

17. The multi-computer system of claim 16, wherein local nodes comprising physical network adapters are configured as OSPF area border routers.

18. The multi-computer system of claim 17, wherein packets are routed over the global shared memory network preferentially to local nodes configured as OSPF area border routers.

19. The multi-computer system of claim 17, wherein OSPF cost metrics are set so that routes to OSPF area border routers are preferentially over the local shared memory network.

20. A multi-computer system, comprising:
a plurality of local nodes interconnected by a shared memory, each local node comprising
a local processor,
a local memory,
a local communications protocol stack, and
a shared memory interface system operable to provide a local shared memory network between the local nodes and a global shared memory network between the local nodes and one or more remote nodes by capturing packets from the local communications protocol stacks and routing the captured packets over the shared memory;
wherein the shared memory interface system on each local node supports multicast and broadcast transmissions over the shared memory for the local shared memory network and the global shared memory network, a broadcast ring structure and a multicast ring structure are allocated in shared memory for each of the local and global shared memory networks, and the broadcast ring structure and the multicast ring structure are reallocated to an active node in response to a failure of a local node originally allocating the broadcast ring structure or the multicast ring structure.

21. A multi-computer system, comprising:
a plurality of local nodes interconnected by a shared memory, each local node comprising
a local processor,
a local memory,
a local communications protocol stack, and
a shared memory interface system operable to provide a local shared memory network between the local nodes and a global shared memory network between the local nodes and one or more remote nodes by capturing packets from the local communications protocol stacks and routing the captured packets over the shared memory;
wherein for each of the local and global shared memory networks a pair of transmit/receive ring structures are allocated in shared memory for each pair of local nodes, and each transmit/receive ring structure corresponds to a pre-allocated number of fixed size scribble buffers in shared memory.

22. A multi-computer system, comprising:
a plurality of local nodes interconnected by a shared memory, each local node comprising
a local processor,
a local memory,
a local communications protocol stack, and
a shared memory interface system operable to provide a local shared memory network between the local nodes and a global shared memory network between the local nodes and one or more remote nodes by capturing packets from the local communications protocol stacks and routing the captured packets over the shared memory;
wherein for each of the local and global shared memory networks a pair of transmit/receive ring structures are allocated in shared memory for each pair of local nodes, a read pointer and a write pointer are associated with each transmit/receive ring structure, and a write pointer is modifiable only by a transmitting node and a read pointer is modifiable only by a receive node.

23. A computer program residing on a computer-readable medium in a multi-computer system comprising a plurality of local nodes interconnected by a shared memory, each local node comprising a local processor, a local memory, and a local communications protocol stack, the computer program comprising computer-readable instructions for causing a computer to perform operations comprising:
providing a local shared memory network between the local nodes and a global shared memory network between the local nodes and one or more remote nodes by capturing packets from the local communications protocol stacks and routing the captured packets over the shared memory;
providing on each local node a local shared memory virtual adapter operable to capture locally addressed packets from the local communications protocol stacks and to route the captured packets for physical transport over the shared memory; and
providing on each local node a global shared memory virtual adapter operable to capture globally addressed packets from the local communications protocol stacks and to route the captured packets for physical transport over the shared memory.

24. The computer program of claim 23, wherein the computer program comprises computer-readable instructions for causing a computer to allocate in shared memory a broadcast ring structure and a multicast ring structure for each of the local and global shared memory networks.

25. The computer program of claim 23, wherein the computer program comprises computer-readable instructions for causing a computer to capture from the local communications protocol stacks packets destined to a global network address and transmitted from a local network address.

26. The computer program of claim 25, wherein the computer program comprises computer-readable instructions for causing a computer to route in-bound packets to other local nodes over the global shared memory network.

27. The computer program of claim 26, wherein the computer program comprises computer-readable instructions for causing a computer to maintain in local memory a data structure identifying active local nodes connected to the global shared memory network.

28. The computer program of claim 23, wherein, for each of the local and global shared memory networks, the computer program comprises computer-readable instructions for causing a computer to allocate in shared memory a pair of transmit/receive ring structures for each pair of local nodes.

29. The computer program of claim 28, wherein the computer program comprises computer-readable instructions for causing a computer to allocate a transmit/receive ring structure in shared memory for each of the other local nodes.

30. The computer program of claim 29, wherein the computer program comprises computer-readable instructions for causing a computer to connect to a transmit/receive ring structure allocated by a given node in response to receipt of a broadcast packet from the given node.

31. The computer program of claim 30, wherein the computer program comprises computer-readable instructions for causing a computer to allocate a transmit/receive ring structure for the given node in response to receipt of the broadcast packet from the given node.

32. A computer program residing on a computer-readable medium in a multi-computer system comprising a plurality of local nodes interconnected by a shared memory, each local node comprising a local processor, a local memory, and a local communications protocol stack, the computer program comprising computer-readable instructions for causing a computer to perform operations comprising:

providing a local shared memory network between the local nodes and a global shared memory network between the local nodes and one or more remote nodes by capturing packets from the local communications protocol stacks and routing the captured packets over the shared memory;

capturing from the local communications protocol stacks packets destined to a global network address and transmitted from a local network address;

routing in-bound packets to other local nodes over the global shared memory network;

maintaining in local memory a data structure identifying active local nodes connected to the global shared memory network; and routing packets to local nodes over the global shared memory network in accordance with an open shortest path first (OSPF) routing protocol.

33. The computer program of claim 32, wherein the computer program comprises computer-readable instructions for causing a computer to configure local nodes comprising physical network adapters as OSPF area border routers.

34. The computer program of claim 33, wherein the computer program comprises computer-readable instructions for causing a computer to route packets over the global shared memory network preferentially to local nodes configured as OSPF area border routers.

35. A computer program residing on a computer-readable medium in a multi-computer system comprising a plurality of local nodes interconnected by a shared memory, each local node comprising a local processor, a local memory, and a local communications protocol stack, the computer program comprising computer-readable instructions for causing a computer to perform operations comprising:

providing a local shared memory network between the local nodes and a global shared memory network between the local nodes and one or more remote nodes by capturing packets from the local communications protocol stacks and routing the captured packets over the shared memory;

allocating in shared memory a broadcast ring structure and a multicast ring structure for each of the local and global shared memory networks; and reallocating the broadcast ring structure and the multicast ring structure to an active node in response to a failure of a local node originally allocating the broadcast ring structure or the multicast ring structure.

36. A computer program residing on a computer-readable medium in a multi-computer system comprising a plurality of local nodes interconnected by a shared memory, each local node comprising a local processor, a local memory, and a local communications protocol stack, the computer program comprising computer-readable instructions for causing a computer to perform operations comprising:

providing a local shared memory network between the local nodes and a global shared memory network between the local nodes and one or more remote nodes by capturing packets from the local communications protocol stacks and routine the captured packets over the shared memory; and allocating in shared memory a pair of transmit/receive ring structures for each pair of local nodes for each of the local and global shared memory networks, wherein each transmit/receive ring structure corresponds to a pre-allocated number of fixed size scribble buffers in shared memory.

37. A method of processing packets in a multi-computer system comprising a plurality of local nodes interconnected by a shared memory, each local node comprising a local processor, a local memory, and a local communications protocol stack, the method comprising:

providing a local shared memory network between the local nodes, and a global shared memory network between the local nodes and one or more remote nodes by capturing packets from the local communications protocol stacks and routing the captured packets over the shared memory;

providing on each local node a local shared memory virtual adapter operable to capture locally addressed packets from the local communications protocol stacks and to route the captured packets for physical transport over the shared memory; and providing on each local node a global shared memory virtual adapter operable to capture globally addressed packets from the local communications protocol stacks and to route the captured packets for physical transport over the shared memory.

* * * * *